(12) United States Patent
Agrawal et al.

(10) Patent No.: US 11,767,400 B2
(45) Date of Patent: Sep. 26, 2023

(54) MANUFACTURE OF DEGRADABLE POLYCYANURATE BULK MOLDING COMPOSITIONS

(71) Applicants: Devesh Agrawal, Houston, TX (US); Anil Sadana, Houston, TX (US); Anton Kovalchuk, Houston, TX (US)

(72) Inventors: Devesh Agrawal, Houston, TX (US); Anil Sadana, Houston, TX (US); Anton Kovalchuk, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 326 days.

(21) Appl. No.: 16/994,983

(22) Filed: Aug. 17, 2020

(65) Prior Publication Data

US 2022/0049056 A1 Feb. 17, 2022

(51) Int. Cl.
*C08G 73/06* (2006.01)
*C08J 5/04* (2006.01)
(Continued)

(52) U.S. Cl.
CPC ............ *C08G 73/065* (2013.01); *B29C 70/06* (2013.01); *C08J 5/041* (2013.01); *C08J 5/042* (2013.01);
(Continued)

(58) Field of Classification Search
None
See application file for complete search history.

(56) References Cited

U.S. PATENT DOCUMENTS 6,245,841 B1  6/2001  Yeager et al.
10,280,699 B2  5/2019  Takahashi et al.
(Continued)

FOREIGN PATENT DOCUMENTS

CA  2032921 A1 *  7/1991
CN  104893649 A *  9/2015
(Continued)

OTHER PUBLICATIONS

Article by Goertzen et al, Thermal and mechanical evaluation of cyanate ester composite with low-temperature processability, Composites Part A: Applied Science and Manufacturing, vol. 38, Issue 3, Mar. 2007, pp. 779-784, Science Direct.*
(Continued)

*Primary Examiner* — Tae H Yoon
(74) *Attorney, Agent, or Firm* — CANTOR COLBURN LLP

(57) ABSTRACT

A process for the manufacture of a degradable polycyanurate bulk molding composition includes: contacting a liquid cyanate ester monomer with an additive material and a polymerization catalyst to form a reaction mixture; maintaining a temperature of the reaction mixture at about 80° C. to about 100° C. to form a polycyanurate product having a viscosity of about 120 to about 200 centipoise at 23° C.; heating a reinforcing filler at a temperature of about 50 to about 150° C. to form a pre-heated reinforcing filler; and blending the polycyanurate product with the pre-heated reinforcing filler to form the degradable polycyanurate bulk molding composition. The bulk molding composition can be used to form a degradable polycyanurate article.

19 Claims, 6 Drawing Sheets

(51) Int. Cl.
 B29C 70/06 (2006.01)
 B29K 79/00 (2006.01)
(52) U.S. Cl.
 CPC .............. *C08J 5/043* (2013.01); *C08J 5/046* (2013.01); *B29K 2079/00* (2013.01); *C08G 2230/00* (2013.01)

(56) References Cited

U.S. PATENT DOCUMENTS

2016/0369083 A1 12/2016 Khatiwada et al.
2017/0152371 A1 6/2017 Duan et al.

FOREIGN PATENT DOCUMENTS

| CN | 108264763 | A |   | 7/2018 |
|----|-----------|---|---|--------|
| CN | 111286158 | A | * | 6/2020 |
| CN | 111548488 | A | * | 8/2020 |
| EP | 0396383   | A2 |  | 11/1990 |
| JP | 2004175925 | A | * | 6/2004 |
| JP | 2004524383 | A | * | 8/2004 |
| JP | 2004296601 | A | * | 10/2004 |
| WO | 2020158956 | A1 |  | 8/2020 |

OTHER PUBLICATIONS

International Search Report for International Application No. PCT/US2021/046123, International Filing Date Aug. 16, 2021, dated Dec. 7, 2021, 5 pages.
Written Opinion for International Application No. PCT/US2021/046123, International Filing Date Aug. 16, 2021, dated Dec. 7, 2021, 3 pages.

* cited by examiner

MANUFACTURE OF DEGRADABLE POLYCYANURATE BULK MOLDING COMPOSITIONS

BACKGROUND

This disclosure relates to methods of manufacture of degradable polycyanurate bulk molding compositions and methods of making degradable articles from the bulk molding compositions.

Polycyanurates are a class of high performance polymers with a high glass transition temperature of greater than 230° C. Polycyanurates also have high strength, heat resistance, flame retardance, and broad chemical resistance, and therefore are widely used in applications such as aerospace and electrical/electronics. To adjust the properties of polycyanurates, various polycyanurate composites are also generally known.

Polycyanurates can be manufactured by polymerizing cyanate ester monomers, such as bisphenol A cyanate ester and bisphenol E cyanate ester. The polymerization reaction is highly exothermic, and if not controlled properly, may lead to runaway reactions, particularly in industry scale applications. In addition, it can be challenging to manufacture polycyanurate articles with uniform properties. Thus there remains a need in the art for safe and efficient methods of manufacturing polycyanurate bulk molding compositions. It would be a further advantage if the manufactured polycyanurate bulk molding compositions can be used to make degradable articles having substantially uniform properties.

BRIEF DESCRIPTION

A process for the manufacture of a degradable polycyanurate bulk molding composition includes: contacting a liquid cyanate ester monomer with an additive material and a polymerization catalyst to form a reaction mixture; maintaining a temperature of the reaction mixture at about 80° C. to about 100° C. to form a polycyanurate product having a viscosity of about 120 to about 200 centipoise at 23° C.; heating a reinforcing filler at a temperature of about 50 to about 150° C. to form a pre-heated reinforcing filler; and blending the polycyanurate product with the pre-heated reinforcing filler to form the degradable polycyanurate bulk molding composition.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
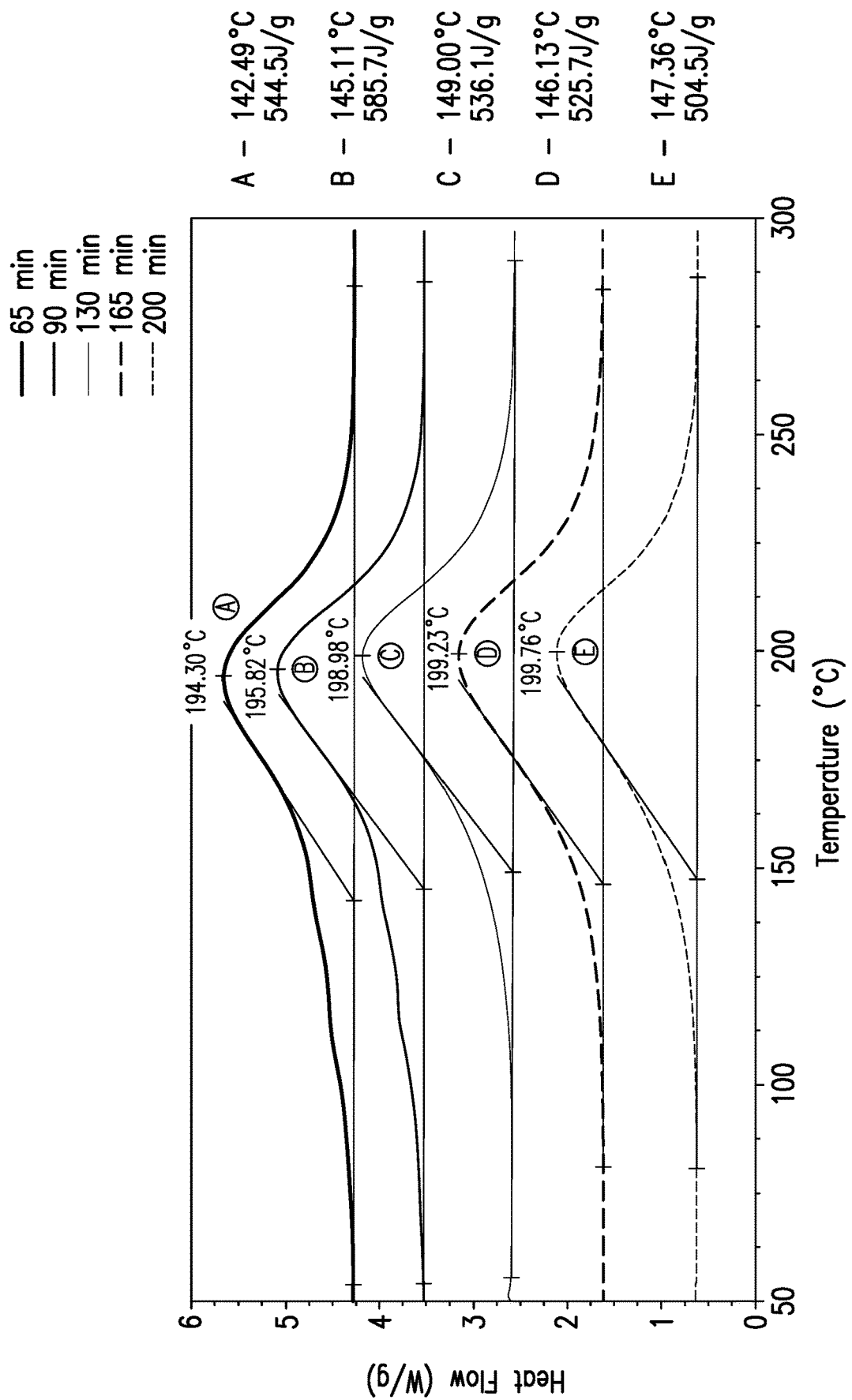
FIG. 1 shows differential scanning calorimetry (DSC) curves of cyanate ester during different stages of its polymerization.

Methods for the manufacture of degradable polycyanurate bulk molding compositions are described. The methods minimize undesirable runaway reactions and produce polycyanurate bulk molding compositions with uniform properties.

The polycyanurate bulk molding compositions can be used to make disposable or degradable downhole tools or other downhole components. The tools or components (articles) made from the polycyanurate bulk molding compositions are able to degrade their mechanical strength and eventually break up without any additional mechanical or hydraulic forces. For example, when contacted with wellbore fluids at elevated temperatures, the corrosion rate of the degradable articles can be controlled in such a way that these articles can maintain their geometry with acceptable but degrading mechanical properties until they are no longer needed, at which time, the articles can break and be easily removed. The degradable articles made from the bulk molding compositions can also have uniform properties.

The degradable polycyanurate bulk molding compositions are manufactured by partial polymerization of a liquid cyanate ester monomer in the presence of a polymerization catalyst and an additive material that facilitates the degradation of the polycyanurate bulk molding compositions and the articles formed therefrom in downhole environments; and blending the partially polymerized product with a pre-heated reinforcing filler thereby forming the degradable polycyanurate bulk molding compositions. Preferably in the produced polycyanurate bulk molding compositions and articles made therefrom, the additive material and the reinforcing filler are homogeneously dispersed in a matrix of a polycyanurate.

The cyanate ester monomer may be a solid or a liquid at room temperature. When the cyanate ester monomer is a solid at room temperature, the cyanate ester monomer is first melted and then combined with the additive material for a period of time before the polymerization catalyst is added.

In an embodiment, the method comprises melting a solid cyanate ester monomer such as bisphenol A cyanate ester, contacting the melted (liquid) cyanate ester monomer with the additive material to form a blend, and adding the polymerization catalyst to the blend thereby forming a reaction mixture. Preferably the melted cyanate ester monomer is blended or mixed with the additive material at a temperature of about 80-100° C. or about 85-90° C. for about 10 minutes to about 1 hour or for about 20 to 40 minutes before any polymerization catalyst is added.

Alternatively the solid cyanate ester monomer can be combined with the additive material, and the combination of the monomer and the additive material is heated to a temperature at or above the melting point of the cyanate ester monomer, and then the melted cyanate ester monomer and the additive material are blended at a temperature that is equal to or above the melting temperature of the monomer, such as about 80-100° C. or about 85-90° C. for about 10 minutes to about 1 hour or for about 20 to 40 minutes before any polymerization catalyst is added. Without wishing to be bound by theory, it is believed that blending melted cyanate ester monomer with the additive material in the absence of polymerization catalysts helps to minimize runaway reactions.

When the cyanate ester monomer is a liquid at room temperature, the monomer such as bisphenol E cyanate ester can also be blended with the additive material and the polymerization catalyst at a temperature of less than about 40° C. or less than about 30° C., for example about 20 to less than 30° C. for about 10 minutes to about 2 hours, or about 20-80 minutes, or about 50-70 minutes to form a reaction mixture. Without wishing to be bound by theory, it is believed that blending the liquid cyanate ester monomer, the additive material, and the polymerization catalyst at a temperature of less than about 40° C. before the polymerization reaction begins helps to minimize runaway reactions.

Preferably, no solvents are used. Accordingly the reaction mixture can contain less than 5 wt %, less than 2 wt %, less than 1 wt %, less than 0.5 wt % or be free of solvents such as organic solvents known to a person skilled in the art or water based on the total weight of the reaction mixture.

As used herein, cyanate ester monomers are compounds generally based on a phenol or a novolac derivative, in which the hydrogen atom of the phenolic OH group is substituted by a cyanide group (—OCN). Examples of cyanate ester monomers include those described in U.S. Pat. No. 6,245,841 and EP 0396383. In an embodiment, cyanate ester monomers are based on resorcinol, p,p'-dihydroxydiphenyl, o,p'-dihydroxydiphenyl methane, 2,2-bis(4-hydroxyphenyl)propane (bisphenol A), tetramethylbisphenol F, hexafluorobisphenol A, bisphenol E, bisphenol M, dicyclopentadienyl bisphenol, o,p'-dihydroxydiphenyl methane, p,p'-dihydroxydiphenyl propane, p,p'-dihydroxydiphenyl sulfone, p,p'-dihydroxydiphenyl sulfide, p,p'-dihydroxydiphenyl oxide, 4,4'-methylenebis(2,6-dimethyl phenol), p,p', p"-tri-hydroxy triphenyl ethane, dihydroxynaphthalene and novolac resins which contain more than 2 phenol moieties per molecule, or a combination thereof. Preferably the cyanate ester monomers include bisphenol A cyanate ester, bisphenol E cyanate ester, bisphenol F cyanate ester, or a combination thereof.

The additive material comprises one or more of an acid; a base; a polyol; or an epoxide. The additive material and the cyanate ester monomer can have a weight ratio of about 5:95 to about 50:50, preferably about 10:90 to about 35:65, more preferably about 15:85 to about 30:70.

The presence of the additive material facilitates and controls the degradation of the polycyanurate articles made from the polycyanurate bulk molding compositions in water, brine, acidic or an alkaline solution at elevated temperatures. The homogeneous distribution of the additive material ensures that the polycyanurate articles have a uniform degradation rate and consistent mechanical properties.

Examples of the base additives include sodium hydroxide, sodium carbonate, potassium hydroxide, potassium carbonate, lithium hydroxide, sodium silicate, sodium metasilicate pentahydrate, potassium silicate, calcium hydroxide, calcium oxide, cesium hydroxide, strontium hydroxide, rubidium hydroxide, magnesium oxide, or a combination comprising at least one of the foregoing. Base additives may be additionally encapsulated with a polymer coating to prevent its premature reaction with a cyanate ester polymer. Examples of the polymer coating include polyvinyl alcohol, polyacrylate, or a combination comprising at least one of the foregoing.

Examples of the acid additives include adipic acid, boric acid, citric acid, oxalic acid, sulfamic acid, ethylene diamine tetraacetic acid, itaconic acid, maleic acid, maleic anhydride, fumaric acid, phtalic acid, phtalic anhydride, or methyl-p-toluene sulfonate, or a combination comprising at least one of the foregoing.

Examples of polyols include polyethylene glycol, polypropylene glycol, or polyvinyl alcohol. Examples of epoxides include glycerol diglycidyl ether, epoxidized soybean oil, epoxidized linseed oil, or brominated bisphenol A diglycidyl ether, or a combination comprising at least one of the foregoing.

The catalysts for cyanate ester polymerization include complexes of a transition metal such as cobalt, copper, chromium, manganese, tin and zinc. Specific examples of the polymerization catalysts include copper naphthenate, copper acetylacetonate, chromium acetylacetonate, cobalt octoate, tin octoate, dibutyltin dilaurate, manganese octoate, or zinc octoate. The catalysts can be used individually or in combination. The loading of the polymerization catalysts is about 100 to about 800 ppm of the metal ion in the catalyst relative to the weight of the cyanate ester monomer.

Figure 2:
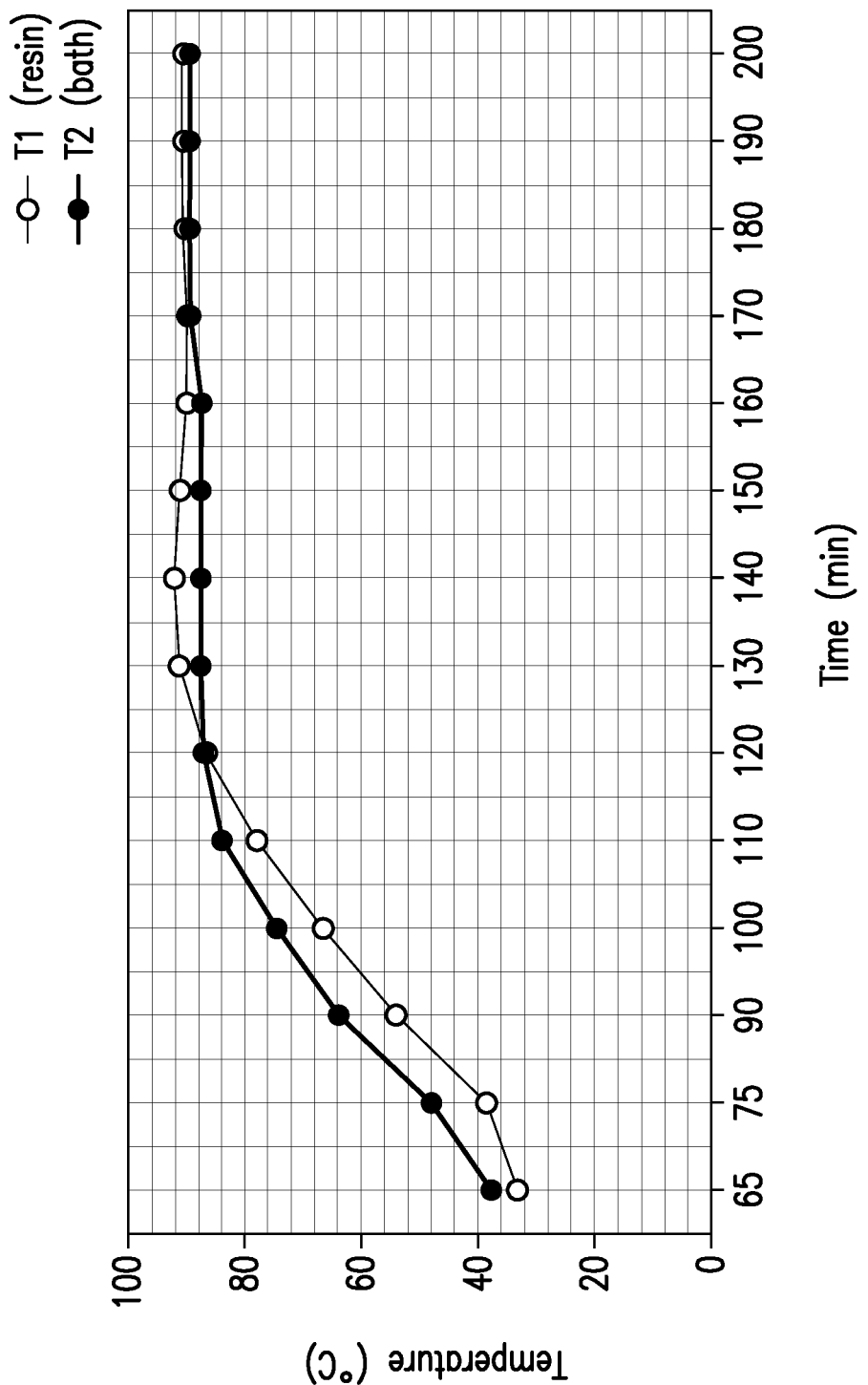
FIG. 2 shows graphs of temperature as a function of time during the polymerization of cyanate ester measured using an in-line viscometer.
Figure 5:
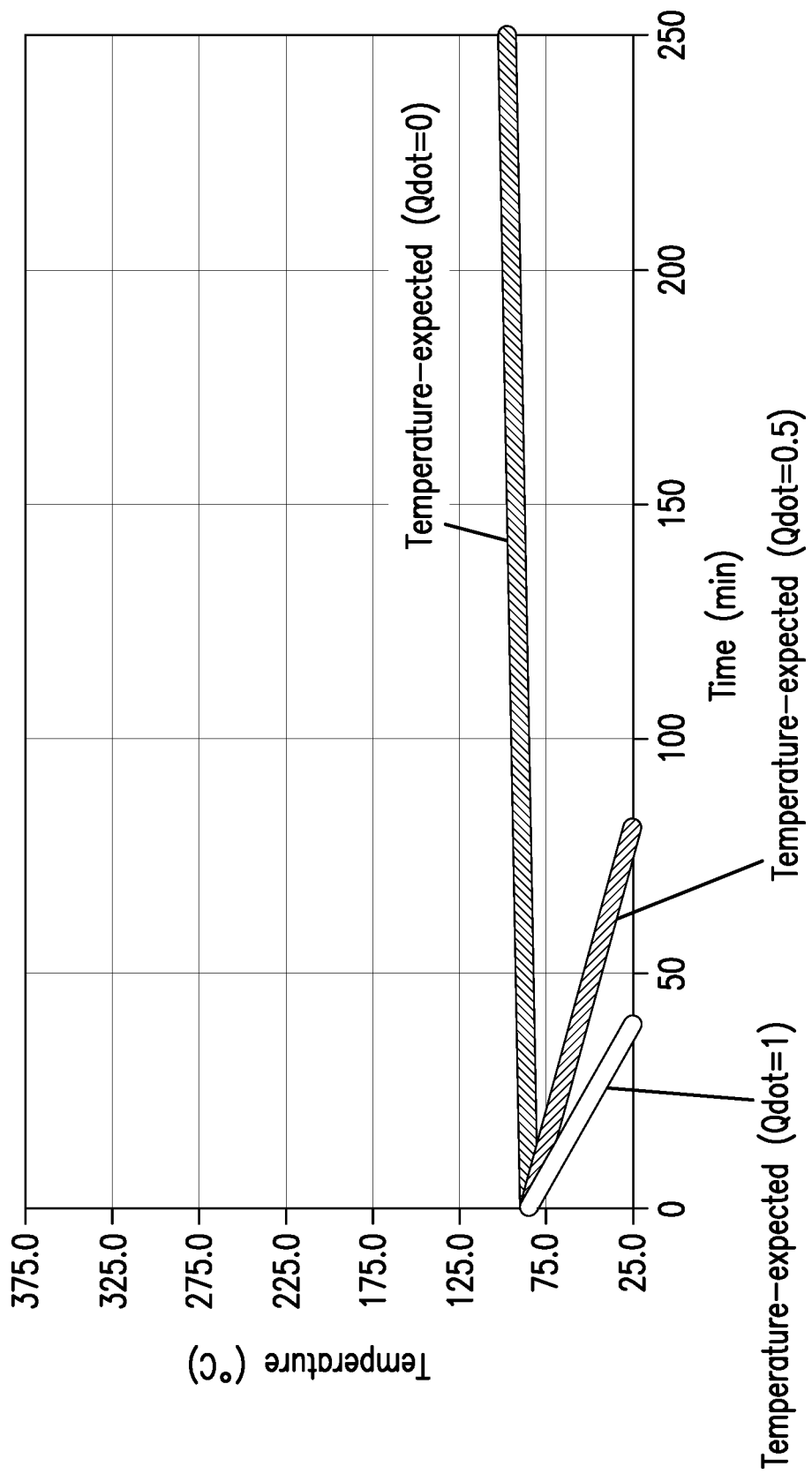
FIG. 5 is a graph of calculated temperature as a function of time during the polymerization of 20 kg cyanate ester.
Figure 6:
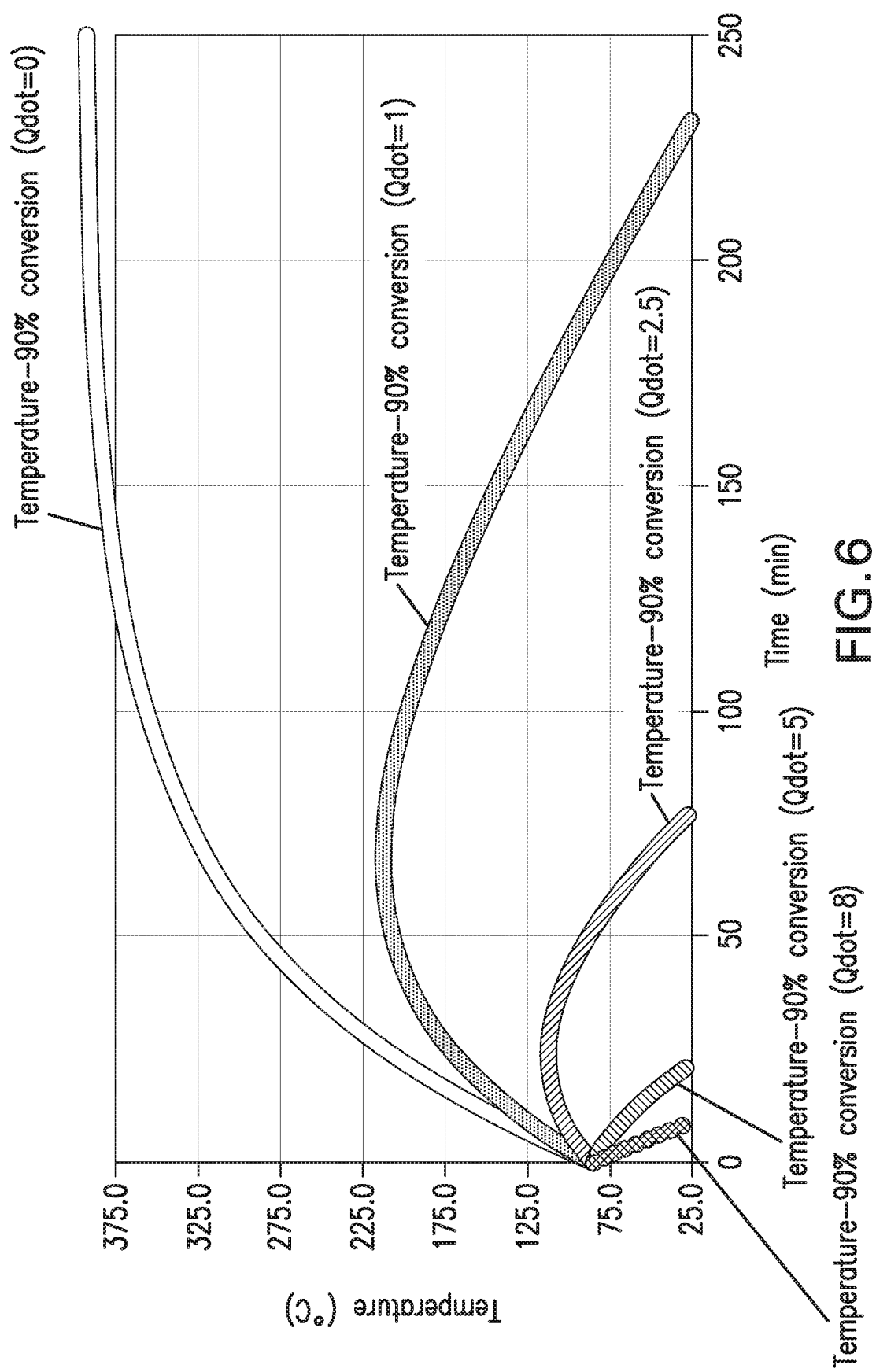
FIG. 6 is a graph of temperature as a function of time during the polymerization of 20 kg cyanate ester with a 90% conversion rate under different cooling conditions.

The polymerization catalysts can be added continuously or in batches such as single or multiple batches. To control the heat generated during the polymerization reaction, the temperature of the reaction mixture, which contains the cyanate ester monomer, the additive material, and the polymerization catalyst, is monitored. FIG. 1 shows differential scanning calorimetry curves of cyanate ester during different stages of its polymerization. As it can be seen from FIG. 1, cooling or heating may be needed in order to keep the temperature of the reaction mixture at about 80-100° C. FIG. 2 shows graphs of temperature as a function of time during the polymerization of cyanate ester measured using an in-line viscometer. FIG. 5 is a graph of calculated temperature as a function of time during the polymerization of 20 kg cyanate ester. FIG. 6 is a graph of temperature as a function of time during the polymerization of 20 kg cyanate ester with a 90% conversion rate under different cooling conditions.

Figure 4:
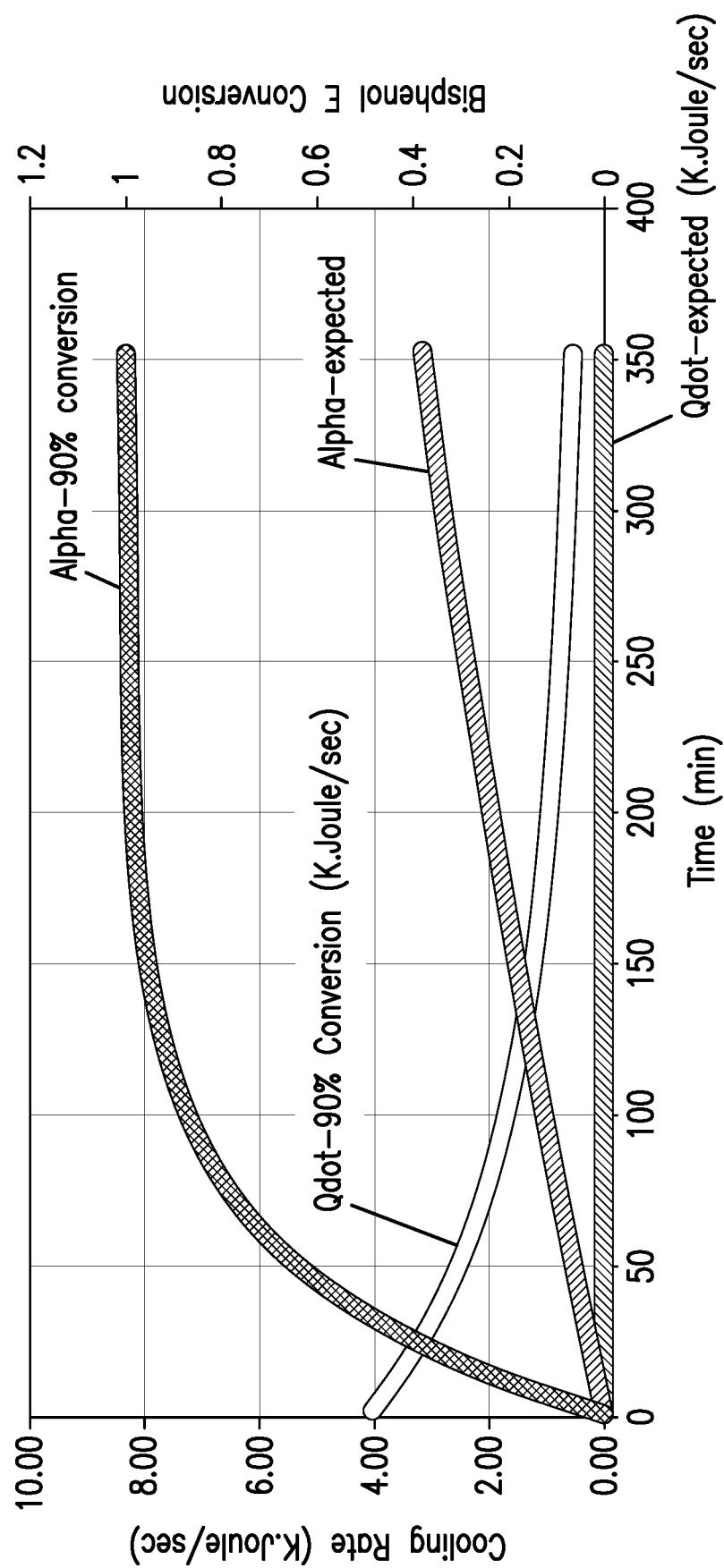
FIG. 4 shows the cooling capacity requirements calculated for the polymerization of 20 kg cyanate ester.

The polymerization can be conducted in a jacketed reactor equipped with an overhead mixer and thermocouples for accurate and continuous temperature monitoring. The temperature of the reaction mixture in a jacketed reactor is maintained by high efficiency circulating oil bath that has both heating and cooling functions. FIG. 4 illustrates the cooling capacity requirements calculated for the polymerization of 20 kg cyanate ester.

Figure 3:
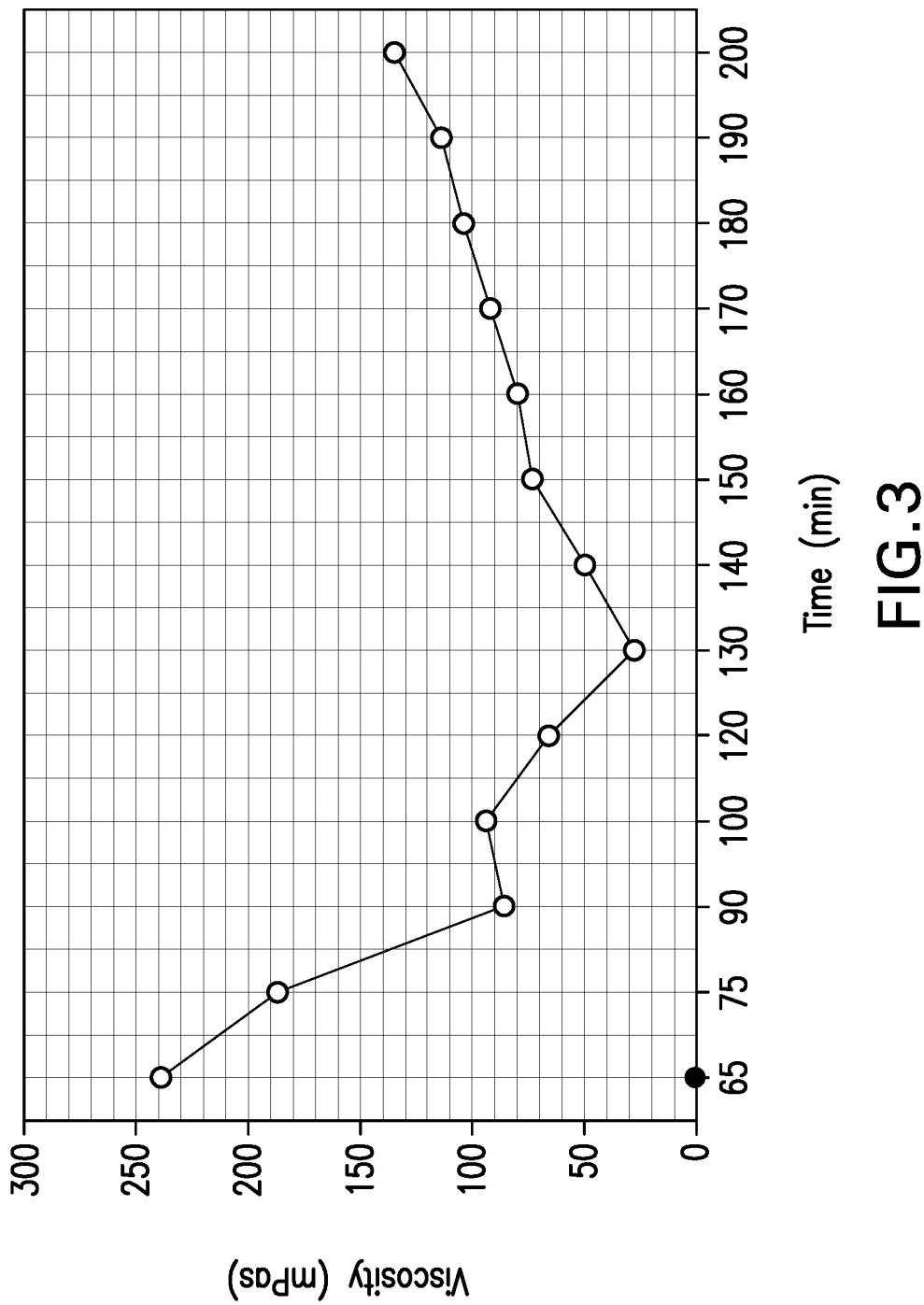
FIG. 3 is a graph of viscosity as a function of time during the polymerization of cyanate ester measured using an in-line viscometer.

The viscosity of the reaction mixture is monitored, for example, using an inline viscometer. FIG. 3 is a graph of viscosity as a function of time during the polymerization of cyanate ester measured using an in-line viscometer. After the viscosity of the reaction mixture reaches about 120 to about 200 cP at 23° C., the polycyanurate product is blended with a pre-heated reinforcing filler to form degradable polycyanurate bulk molding compositions. The polycyanurate product comprises a polycyanurate having a viscosity of about 120 to about 200 centipoise at 23° C., which can form a matrix of the degradable polycyanurate bulk molding compositions. In an embodiment, the polycyanurate product is poured into a mixer such as planetary mixer before blended with the pre-heated reinforcing filler.

The amount of the reinforcing filler is about 20 to about 60 wt %, or about 5 to about 30 wt % based on the total weight of the degradable polycyanurate bulk molding compositions. The reinforcing filler can be pre-heated at a temperature of about 50 to about 150° C., about 90 to about 150° C., or about 80 to about 120° C., preferably about 110 to about 120° C. for about 1 to about 8 hours, or about 3 to about 5 hours. The reinforcing fillers include glass fibers, carbon fibers, polymer fibers, or metal fibers. Specific examples of the reinforcing fillers include chopped glass fibers (E-glass, S-glass, soda lime glass), aluminum fibers, steel fibers, zinc fibers, carbon fibers, polyamide fibers, nylon fibers, aramide fibers, Kevlar fibers, polyethylene fibers, polypropylene fibers, Spectra fibers, Dyneema fibers, or polylactic acid fibers, or a combination comprising at least one of the foregoing.

The degradable polycyanurate bulk molding compositions can be molded to form degradable articles which can be used as tools or implements, e.g., in a downhole environment. In an embodiment, the degradable polycyanurate bulk molding compositions are molded at a temperature of about 20° C. to about 250° C., preferably about 70 to about 130° C. and a pressure of about 15 psi to about 30,000 psi, about 500 psi to about 30,000 psi, or about 1,000 psi to about 5,000 psi to form the degradable articles. The partially cured polycyanurate in the bulk molding compositions can be fully cured during the molding process.

If needed, the molded polycyanurate articles can be further machined or shaped to form a bar, block, tubular, cylindrical billet, or toroid. Machining includes cutting, sawing, ablating, milling, facing, lathing, boring, and the like using, for example, a miller, saw, lathe, router, electric discharge machine, and the like. Alternatively, the polycyanurate articles can be directly molded to the useful shape by choosing the molds having the desired shape.

The produced degradable polycyanurate articles can have a corrosion rate of about 0.1 to about 450 $mg/cm^2/hour$, about 0.5 to about 400 $mg/cm^2/hour$, about 1 to about 350 $mg/cm^2/hour$, about 5 to about 300 $mg/cm^2/hour$; or about 10 to about 250 $mg/cm^2/hour$ in an aqueous 3 wt % KCl solution at 200° F. (93° C.).

As mentioned above, the degradable articles have strengths to bear load during plug applications and dissolve away to create an unobstructed pathway when treated with selective fluid formulations, making perf-and-plug jobs intervention-less operations.

Set forth below are various embodiments of the disclosure.

Embodiment 1. A process for the manufacture of a degradable polycyanurate bulk molding composition, the process comprising: contacting a liquid cyanate ester monomer with an additive material and a polymerization catalyst to form a reaction mixture; maintaining a temperature of the reaction mixture at about 80° C. to about 100° C. to form a polycyanurate product having a viscosity of about 120 to about 200 centipoise at 23° C.; heating a reinforcing filler at a temperature of about 50 to about 150° C. or 50 to 120° C. to form a pre-heated reinforcing filler; and blending the polycyanurate product with the pre-heated reinforcing filler to form the degradable polycyanurate bulk molding composition.

Embodiment 2. The process as in any prior embodiment, wherein the liquid cyanate ester monomer comprises bisphenol E cyanate ester, and the process comprises contacting bisphenol E cyanate ester and the additive material in the presence of the polymerization catalyst at a temperature of less than about 40° C. for about 10 minutes to about 2 hours to form the reaction mixture.

Embodiment 3. The process as in any prior embodiment, wherein the liquid cyanate ester monomer comprises bisphenol A cyanate ester, and the process further comprises: melting bisphenol A cyanate ester to form the liquid cyanate ester monomer; contacting the liquid cyanate ester monomer with the additive material in the absence of the polymerization catalyst at a temperature of about 80-100° C. for about 10 minutes to about 1 hour to form a blend; and adding the polymerization catalyst to the blend to form the reaction mixture.

Embodiment 4. The process as in any prior embodiment, further comprising: monitoring a temperature and a viscosity of the reaction mixture.

Embodiment 5. The process as in any prior embodiment, comprising cooling or heating the reaction mixture to maintain the temperature of the reaction mixture at about 80° C. to about 100° C. to form the polycyanurate product.

Embodiment 6. The process as in any prior embodiment, wherein the polymerization catalyst comprises a metal complex of cobalt, copper, chromium, manganese, tin, zinc, or a combination comprising at least one of the foregoing.

Embodiment 7. The process as in any prior embodiment, wherein the polymerization catalyst is present in an amount of about 100 to 800 ppm based on an amount of a metal ion in the polymerization catalyst relative to an amount of the cyanate ester monomer.

Embodiment 8. The process as in any prior embodiment, wherein the polymerization catalyst is added continuously.

Embodiment 9. The process as in any prior embodiment, wherein the polymerization catalyst is added in single or multiple batches.

Embodiment 10. The process as in any prior embodiment, wherein the reaction mixture is free of solvents.

Embodiment 11. The process as in any prior embodiment, wherein the additive material comprises one or more of the following: an acid; a base; a polyol; or an epoxide.

Embodiment 12. The process as in any prior embodiment, wherein the additive material is present in an amount of about 5 to about 30 wt % based on the total weight of the reaction mixture.

Embodiment 13. The process as in any prior embodiment, wherein the additive material comprises the acid, which comprises one or more of the following: adipic acid; boric acid; citric acid; oxalic acid; sulfamic acid; ethylene diamine tetraacetic acid; itaconic acid; maleic acid; maleic anhydride; fumaric acid; phtalic acid; phtalic anhydride; or methyl-p-toluene sulfonate.

Embodiment 14. The process as in any prior embodiment, wherein the additive material comprises the base, which comprises one or more of the following: sodium hydroxide; sodium carbonate; potassium hydroxide; potassium carbonate; lithium hydroxide; sodium silicate; sodium metasilicate pentahydrate; potassium silicate; calcium hydroxide; calcium oxide; cesium hydroxide; strontium hydroxide; rubidium hydroxide; or magnesium oxide.

Embodiment 15. The process as in any prior embodiment, wherein the reinforcing filler comprises one or more of the following: carbon fibers; glass fibers; polymer fibers; or metal fibers.

Embodiment 16. The process as in any prior embodiment, wherein the reinforcing filler is present in an amount of about 20 to about 60 wt. % based on the total weight of the degradable polycyanurate bulk molding composition.

Embodiment 17. The process as in any prior embodiment, wherein the reinforcing filler is heated at about 110 to about 120° C. for about 3 to about 5 hours to form the pre-heated reinforcing filler.

Embodiment 18. The process as in any prior embodiment, further comprising pouring the polycyanurate product into a mixer, and the pre-heated reinforcing filler is blended with the polycyanurate product in the mixer.

Embodiment 19. The process as in any prior embodiment, wherein the additive material and the reinforcing filler are homogeneously dispersed in a matrix of a polycyanurate.

Embodiment 20. A process for the manufacture of a degradable article, the process comprising: forming a degradable polycyanurate bulk molding composition via a process as in any prior embodiment; and molding the degradable polycyanurate bulk molding composition to form the degradable article.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A process for the manufacture of a degradable polycyanurate bulk molding composition, the process comprising:
    contacting a liquid cyanate ester monomer with an additive material and a polymerization catalyst to form a reaction mixture;
    maintaining a temperature of the reaction mixture at about 80° C. to about 100° C.;
    monitoring a viscosity of the reaction mixture using an inline viscometer;
    forming a polycyanurate product when the viscosity of the reaction mixture reaches about 120 to about 200 centipoise;
    heating a reinforcing filler at a temperature of about 50 to about 150° C. to form a pre-heated reinforcing filler; and
    blending the polycyanurate product having a temperature of 80-100° C. with the pre-heated reinforcing filler to form the degradable polycyanurate bulk molding composition.

2. The process of claim 1, wherein
    the liquid cyanate ester monomer comprises bisphenol E cyanate ester, and
    the process comprises contacting bisphenol E cyanate ester and the additive material in the presence of the polymerization catalyst at a temperature of less than 40° C. for about 10 minutes to about 2 hours to form the reaction mixture.

3. The process of claim 1, wherein
    the liquid cyanate ester monomer comprises bisphenol A cyanate ester, and
    the process further comprises:
    melting bisphenol A cyanate ester to form the liquid cyanate ester monomer;
    contacting the liquid cyanate ester monomer with the additive material in the absence of the polymerization catalyst at a temperature of about 80-100° C. for about 10 minutes to about 1 hour to form a blend; and
    adding the polymerization catalyst to the blend to form the reaction mixture.

4. The process of claim 1, comprising cooling or heating the reaction mixture to maintain the temperature of the reaction mixture at about 80° C. to about 100° C. to form the polycyanurate product.

5. The process of claim 1, wherein the polymerization catalyst comprises a metal complex of cobalt, copper, chromium, manganese, tin, zinc, or a combination comprising at least one of the foregoing.

6. The process of claim 1, wherein the polymerization catalyst is present in an amount of about 100 to 800 ppm based on an amount of a metal ion in the polymerization catalyst relative to an amount of the cyanate ester monomer.

7. The process of claim 1, wherein the polymerization catalyst is added continuously.

8. The process of claim 1, wherein the polymerization catalyst is added in single or multiple batches.

9. The process of claim 1, wherein the reaction mixture is free of solvents.

10. The process of claim 1, wherein the additive material comprises one or more of the following: an acid; a base; a polyol; or an epoxide.

11. The process of claim 1, wherein the additive material is present in an amount of about 5 to about 30 wt % based on the total weight of the reaction mixture.

12. The process of claim 10, wherein the additive material comprises the acid, which comprises one or more of the following: adipic acid; boric acid; citric acid; oxalic acid; sulfamic acid; ethylene diamine tetraacetic acid; itaconic acid; maleic acid; maleic anhydride; fumaric acid; phtalic acid; phtalic anhydride; or methyl-p-toluene sulfonate.

13. The process of claim 10, wherein the additive material comprises the base, which comprises one or more of the following: sodium hydroxide; sodium carbonate; potassium hydroxide; potassium carbonate; lithium hydroxide; sodium silicate; sodium metasilicate pentahydrate; potassium silicate; calcium hydroxide; calcium oxide; cesium hydroxide; strontium hydroxide; rubidium hydroxide; or magnesium oxide.

14. The process of claim 1, wherein the reinforcing filler comprises one or more of the following: carbon fibers; glass fibers; polymer fibers; or metal fibers.

15. The process of claim 1, wherein the reinforcing filler is present in an amount of about 20 to about 60 wt. % based on the total weight of the degradable polycyanurate bulk molding composition.

16. The process of claim 1, wherein the reinforcing filler is heated at about 110 to about 120° C. for about 3 to about 5 hours to form the pre-heated reinforcing filler.

17. The process of claim 1, further comprising pouring the polycyanurate product into a mixer, and the pre-heated reinforcing filler is blended with the polycyanurate product in the mixer.

18. The process of claim 1, wherein the additive material and the reinforcing filler are homogeneously dispersed in a matrix of a polycyanurate.

19. A process for the manufacture of a degradable article, the process comprising:
    forming a degradable polycyanurate bulk molding composition via a process of claim 1; and
    molding the bulk molding composition to form the degradable polycyanurate article.

* * * * *